US009124635B2

(12) United States Patent
Robinson et al.

(10) Patent No.: US 9,124,635 B2
(45) Date of Patent: Sep. 1, 2015

(54) VERIFIED SENSOR DATA PROCESSING

(71) Applicant: Intel Corporation, Santa Clara, CA (US)

(72) Inventors: Scott H. Robinson, Portland, OR (US); Jason Martin, Beaverton, OR (US); Howard C. Herbert, Phoenix, AZ (US); Michael LeMay, Hillsboro, OR (US); Karanvir Ken S. Grewal, Hillsboro, OR (US); Keith L. Shippy, Tempe, AZ (US); Geoffrey Strongin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 197 days.

(21) Appl. No.: 13/690,666

(22) Filed: Nov. 30, 2012

(65) Prior Publication Data

US 2014/0157349 A1 Jun. 5, 2014

(51) Int. Cl.
*H04L 29/06* (2006.01)

(52) U.S. Cl.
CPC .............. *H04L 63/20* (2013.01); *H04L 63/105* (2013.01)

(58) Field of Classification Search
CPC ......... G06F 21/32; G06F 21/53; H04L 63/18; H04L 63/20; H04L 63/105; H04L 21/53; G06T 7/0022; G06T 7/0041; G06K 9/00221; G06K 9/00335
USPC ....................... 726/1-3, 26-30; 709/223-225
See application file for complete search history.

(56) References Cited

U.S. PATENT DOCUMENTS

| | | | | |
|---|---|---|---|---|
| 8,411,113 | B1 * | 4/2013 | Cornell et al. | 345/629 |
| 8,812,828 | B2 * | 8/2014 | Datta et al. | 713/2 |
| 8,837,733 | B2 * | 9/2014 | Alpert et al. | 380/270 |
| 2003/0063087 | A1 * | 4/2003 | Doyle et al. | 345/422 |
| 2006/0282671 | A1 * | 12/2006 | Burton | 713/176 |
| 2008/0182592 | A1 * | 7/2008 | Cha et al. | 455/456.3 |
| 2009/0257589 | A1 * | 10/2009 | Yokota et al. | 380/216 |
| 2010/0034457 | A1 * | 2/2010 | Berliner et al. | 382/154 |
| 2010/0292556 | A1 * | 11/2010 | Golden | 600/364 |
| 2011/0065419 | A1 * | 3/2011 | Book et al. | 455/411 |
| 2011/0145916 | A1 * | 6/2011 | McKenzie et al. | 726/19 |
| 2011/0158470 | A1 * | 6/2011 | Martin et al. | 382/100 |
| 2011/0209194 | A1 * | 8/2011 | Kennedy | 726/1 |
| 2011/0225626 | A1 * | 9/2011 | Covington et al. | 726/1 |
| 2011/0320823 | A1 * | 12/2011 | Saroiu et al. | 713/189 |
| 2012/0030110 | A1 * | 2/2012 | Prakash et al. | 705/44 |
| 2012/0222083 | A1 * | 8/2012 | Vaha-Sipil et al. | 726/1 |
| 2012/0317555 | A1 * | 12/2012 | Aluru et al. | 717/134 |
| 2013/0101175 | A1 * | 4/2013 | Lynch | 382/106 |
| 2013/0159704 | A1 * | 6/2013 | Chandrasekaran | 713/156 |
| 2013/0174211 | A1 * | 7/2013 | Aad et al. | 726/1 |
| 2013/0243189 | A1 * | 9/2013 | Ekberg et al. | 380/44 |
| 2013/0286162 | A1 * | 10/2013 | Lee et al. | 348/46 |
| 2014/0096182 | A1 * | 4/2014 | Smith | 726/1 |
| 2014/0137178 | A1 * | 5/2014 | Thom et al. | 726/1 |

* cited by examiner

*Primary Examiner* — Catherine Thiaw
(74) *Attorney, Agent, or Firm* — Trop, Pruner & Hu, P.C.

(57) ABSTRACT

Sensor data may be filtered in a secure environment. The filtering may limit distribution of the sensor data. Filtering may modify the sensor data, for example, to prevent identification of a person depicted in a captured image or to prevent acquiring a user's precise location. Filtering may also add or require other data use controls to access the data. Attestation that a filter policy is being applied and working properly or not may be provided as well.

29 Claims, 6 Drawing Sheets

VERIFIED SENSOR DATA PROCESSING

BACKGROUND

This relates generally to computer systems and, particularly, to providing privacy and security protection for computer users.

Modern computer systems may be connected to a variety of sensors. For example, desktop computers, laptop computers, and cellular telephones may include cameras which acquire pictures. Mobile devices may include global positioning system detectors which feed information about the user's current location.

In many cases, the users want this information to be processed or collected locally or made available to remote devices over computer networks, including the Internet. However, this may create problems with respect to misuse of the data by unintended recipients. People that obtain videos from users could use those videos for purposes that are adverse to the user's interest. Similarly, the user's current location could be used by those with malicious or criminal intent.

BRIEF DESCRIPTION OF THE DRAWINGS

Some embodiments are described with respect to the following figures.

DETAILED DESCRIPTION

Figure 1:
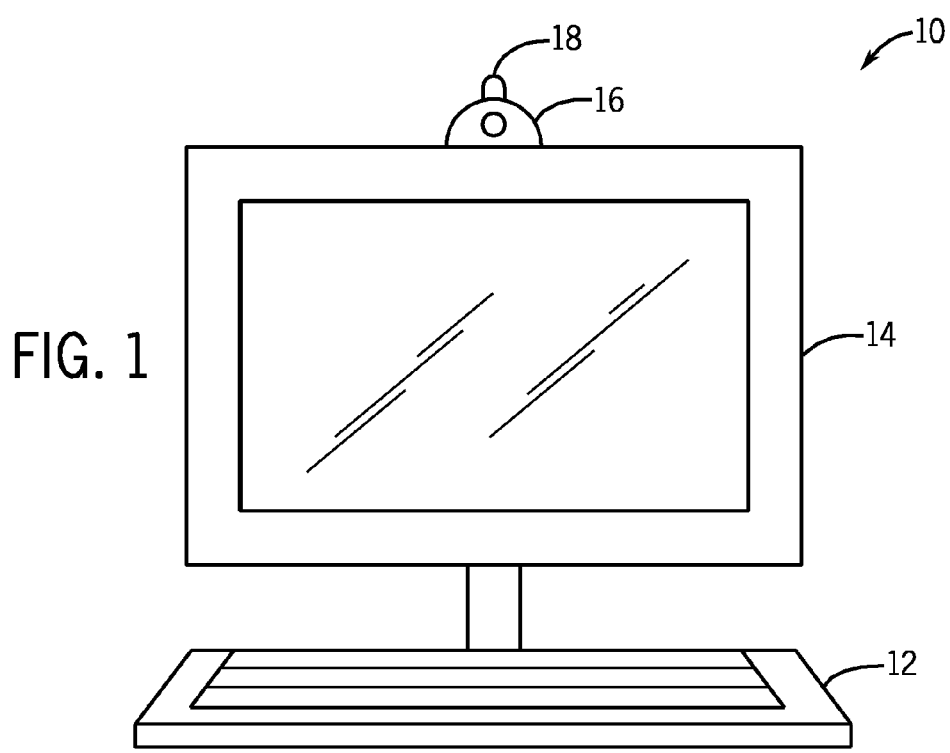
FIG. 1 is a depiction of a computer in accordance with one embodiment.

Referring to FIG. 1, a computer system 10 may be coupled to a sensor 16, such as a video camera. The sensor could also be a microphone, location or global positioning system device, biometric sensor, DNA strand sequencer, blood glucose monitor, brain waves or thought signal sensor (e.g. Emotiv's EPOC), accelerometer, compass, barometer, touch sensor, etc, to give a few examples. Some sensors may have limited use lifetime (e.g. use only one time) while others can be used repeatedly. Some sensors may be integrated directly into the platform or system-on-chip (SoC) or connected through I/O or network communication ports which may be cabled or wireless such as Universal Serial Bus (USB), WiFi, BlueTooth, etc. In some embodiments, sensor data may be pulled from or pushed to the environment via these connections. In some embodiments, the sensor data itself contains sensitive information such as a picture or image of an individual. In other cases, derived data after detailed processing of the original sensor data contains sensitive information such as the emotional state of an individual. The system 10, itself, may be a wired computer system, such as a desktop computer. It may also be a mobile computer system, such as a laptop computer, a mobile Internet device, a tablet, a cellular telephone (e.g. smartphone), a robot or tele-presence avatar.

Some embodiments include embedded processing and control systems which can be contained as subsystems of, for example, power monitoring and management systems, security systems, automotive systems, robotic systems, medical systems, industrial, military or agricultural systems, aerospace systems, building or city management and control systems, etc.

In this description, the "user" can refer to one or a plurality of different agents or entities depending on context. As apparent to those skilled in the art, the user, for example, can be: a person, say owning the sensing device; a user of the device (who may or may not be the device owner); a group of people, local or remote; local or remote infrastructure; owners or managers of an environment (e.g. enterprise information technology (IT) department), combinations of these various users, and so on. Such users and environment stakeholders are often determined by their respective interests in privacy or security. In an embodiment, the capabilities presented may also be used to manage or achieve other device or environment effects and attributes such as power, or battery life, or performance.

It is anticipated that sensor data protection will become increasingly important as the numbers of sensor types increases. Other trends will also contribute to the need for sensor data protection, such as "always-on" sensing where sensors are being turned on for continuous operation over long periods of time in order to collect data from which context (e.g. user habits) or services can be derived such as location-based notifications, gesture or speech recognition. Another trend will be the ubiquity of these sensors in our environment. In some embodiments, the data collected by the sensor 16 may be provided over networks to remote users. The system's sensor measurement capabilities (observability) and what might be inferred directly or indirectly from such measurements creates potential privacy and/or security problems for the device user as well as the environment. In some embodiments, a display screen 14 may be coupled to a platform 12. A platform 12 may then be coupled via a network to the Internet so that the data from the sensor 16 may be accessed remotely. The user's position, detected using the global positioning system, or other user biometric data could be used to obtain requested services, for example. However, the user's current position or other such sensor data could also be misused by criminals to commit crimes against the computer system user. Threats such as the alleged, nation-state-crafted malware "Flame" or "Gh0stRAT" already leverage sensors such as the microphone to eavesdrop on targeted environments.

In an embodiment, the environment or the system will select (possibly defaults) or have the user select a policy for controlling the distribution of sensor data. In a corporate environment, the corporate IT department may set the policy. The policy may incorporate context data including the system or network topology, available external protection policies and services (e.g. access controls), external policy requirements (e.g. for the environment), sensor data consumers (entities and capabilities), and other static or situational information. So, for example, in a mobile phone E911 emergency services may require that location information be made available to the phone network operators for emergency uses.

The policy controls distribution by using sensor data filtering, data access control or cryptographic mechanisms. The selection of controls to be used is determined by the threat models that need to be guarded against and are understood by those skilled in the art. These include specific means to protect information confidentiality, integrity and availability, and depend on the security and privacy objectives. For instance, a home personal computer system might be relatively safe from physical hardware attacks, but open to down-the-wire network or software attacks. In such systems, communication over dedicated links between trusted subsystems may be sufficient to prevent sensor data leakage. In other embodiments, encryption of the sensor data may be required. For sensor data that is released into uncontrolled environments, data may require encryption with securely managed key distribution to remain protected. In such embodiments, other metadata may be included and it is possible that multiple representations, abstractions or forms of sensor data are provided in hierarchical or clustered forms (e.g. complex data structures). Other information and attributes such as auditing, utility, authenticity or reputation information may also be factored in or attached. Some forms of sensor data may be the result of abstracting, obscuring or removing (e.g. redacting) certain information. Different levels of hierarchy or clustering of data may be protected with different access control levels or mechanisms. As a simple example, clusters of information derivable from a picture that might be protected differently: (a) person's gender, unencrypted; (b) person's current, inferred emotion and timestamp, encrypted; (c) picture of person, encrypted.

Under control of a policy, sensor data distribution can include processing to incorporate other context. It may include data reduction or other more advanced data analysis and synthesis algorithms. The policy may also require the addition of metadata and other access control information or encryption in order to conform with available protection policies in the rest of the system or network in which the embodiment is situated. For example, it may be possible to use native protection services from the local operating system or network. Some system implementations may provide confidentiality and integrity protections for subsystems employing embodiments such as dedicated or encrypted internal buses.

In systems lacking protections, the policy would likely be set to only allow what is absolutely needed. For instance, raw 3D video, as might be produced from a Microsoft Kinect camera, may be analyzed to extract user gaze information (where is the user looking), and the embodiment may only output user gaze information to the rest of the unprotected system. The raw 3D video being destroyed without sending it on further.

Embodiments may be employed at different levels of a single computing system such as hardware, middleware and application software levels. In such cases, each level may be responsible for different policies and scope. A simple policy at the hardware level might ensure no sensor data leaves the hardware level—effectively guaranteeing that all sensors are logically off as far as the rest of the system is concerned. Another hardware-level policy might permit pass through of unmodified data to protected or trusted middleware layers. If data is transferred through attackable surfaces such as a shared bus or unprotected memory, it might be protected using cryptographic methods to ensure confidentiality and integrity (e.g. encryption and cryptographic hashes).

In an embodiment, policy execution may also be chained across networks of devices or systems thus functionally composing a series of sensor protection policies. Embodiments can serve as a foundation for the creation of secure virtual sensors which may be the combination of multiple physical world sensors as well as software-derived context.

In order to protect the confidentiality and integrity of the sensor data and its distribution, in an embodiment, policy storage, selection and execution takes place in a trusted manner. Specifically, policies are executed from a trusted execution environment. In one embodiment, polices are executed from a specific type of trusted execution environment, referred to herein as a "Secure Enclaves processor feature" of the type as described in International published Patent Application WO/2011/078855, published 30.06.2011, for example. In an embodiment, policies may be stored in a cryptographically protected database or set of files.

In an embodiment, if the integrity of the trusted execution environment is compromised, the system can shut down the processing and distribution of sensor data or take other corrective actions. There may be exceptions based on the sensor data type and uses or to accommodate other policies of the environment. For example, embodiments protecting location may need to allow access to location data in order to comply with mandates such as the U.S. Federal Communications Commission's Enhanced-9-1-1 for wireless services.

In an embodiment, policy selection and policy mode changes can be automatic, context-driven or user-selected. In an embodiment, the system can proactively or reactively indicate to the user which policy is currently in place. The system indicates to the user when sensor data is being protected or not. In an embodiment, system integrity can be integrated into the response to form an attestation to the user or environs about protection. In an embodiment one user may have exclusive control over selecting a sensor's protection policies. In an embodiment, one user may exclusively receive attestations about policy's operation. In an embodiment a plurality of users may each have control over selecting a sensor's protection policies. In an embodiment, a plurality of users may receive attestations about policy operation. Thus, some policies might be exclusively controlled and/or observed (i.e. receiving attestation) by one user, while others are not. The determination of applicability will be apparent to those skilled in the art.

In an embodiment, attestations are made to local or remote entities. For instance, the attestation might be made to both a device user and an enterprise's Information Technology (IT) infrastructure. In an embodiment, the infrastructure may be given permission to query the state of or select policy. This can be used to implement audio or video anti-recording policies, for example.

In an embodiment, for legacy operation and other circumstances, sensor data can be passed through unmodified without distribution restrictions. In an embodiment, a legacy policy passes through sensor data unmodified and may provide no protection. In an embodiment, the legacy policy is implemented by not installing a policy or installing an empty or null policy enforcement mechanism. In one embodiment, pass through may be done by tearing down or bypassing the policy system. In one embodiment, pass through policies are used. Other implementation-dependent mechanisms may be selected to optimize for other parameters such as latency or power consumption.

In accordance with some embodiments, filtering limits who can obtain the sensor data by obscuring or removing (e.g. redacting) the sensor data in a way that reduces the likelihood of its misuse. For example, video data could be filtered by blackening those depth-labeled image pixels greater than 4 feet from the camera or use facial blurring so that the person cannot be identified from the image. Location information from a global positioning system could be sanitized, biased or dithered so that the user's exact time-space position cannot be determined. In some cases, the entities that can obtain the information may be screened in accordance with a filtering policy engine or a policy management interface. In an embodiment, these entities are white-listed applications. In an embodiment, white-listed applications run from a trusted execution environment.

The connection between the sensor 16 and the computer may be secure as well. For example, it may be a cryptographically protected channel or use a dedicated channel. The filtering operation may be executed in a trusted execution environment in some embodiments. Using a secure channel and a trusted execution environment aids in preventing attackers (e.g. malware) from co-opting or compromising the filtering operation. The intended result is that sensor data is protected from the sensor production source to the application of policy in the trusted execution environment which, in turn, affects the use of the data and its derivatives over their lifetimes. That is, the sensor data or derivations of that sensor data can be protected over its use lifetime.

In some embodiments, the policy enforcement mechanism is attestable to the user, which includes sensor data filtering. Attestations by the system demonstrate proper policy enforcement for information analysis and transmission. When changes to the policy or its function are attempted, the system may either request user acceptance as a condition to implementing the changes or provide user notification. This prevents unauthorized modifications intended to subvert the privacy or security protections achieved by the filtering mechanism or, conversely, deny data availability.

In some embodiments the access control policy needed to access sensor data may be enforced by other entities or services in the system or network that are trusted. For example, in one embodiment, a smartphone-connected heart monitor may capture real-time data about a patient which gets cryptographically (confidentiality and integrity) protected by the embodiment before being transmitted to the patient's doctor over the Internet. During this process the patient's smartphone can provide assurance that the data collection and transmission are done correctly with confidentiality and integrity. If integrity of the system were violated, the smartphone may issue an alarm using a trusted output speaker and display while marking data transmitted to the doctor as being suspect or tainted.

As another example, a platform may have a depth-sensing video camera for interaction with an Internet-connected gaming console. A filtering mechanism may be configured to only emit the user's eye-gaze vector or body-gesture information and no audio or video-derived information to other components of the entertainment system. A camera and microphone can gather all raw audio and video data, but the filtering component running in the trusted execution environment of the embodiment may use facial recognition to find user gaze or gesture information and selectively pass only that information on to other components in the system. The system may be constructed and certified to have these properties to thwart malicious software attacks. In this example, the filtering mechanism allows the entertainment system use to operate unimpeded, yet filtering policy protects the family's personal information, such as video of their children, activities, emotions, family presence or absence, or house contents information.

In some embodiments, a trusted light indicator 18 (FIG. 1) may show the status of the system. The trusted light indicator is designed so that it can only be controlled (e.g. toggled) by system entities within the trusted computing base (TCB) so that malicious agents cannot modify the policy status indication. In an embodiment, the trusted light may feature symbols conveying status. In an embodiment the trusted light may be a lighted or backlight personalized or company trademark symbol. In an embodiment, when the light is on, the protections are on; and when the light is off, protections are off. In an embodiment, the light may change color depending on the current policies, red to indicate an untrusted environment, green to mean trusted, orange to indicate an intermediate state. In an embodiment, the indicator may be something other than a light such as a textual based display or a haptic interface that allows touch or feel to indicate system status. In an embodiment, the indicator may signal policy changes and status by vibrations or sequences of vibrations. For instance, a short vibration followed by a short, interstitial pause followed by a long vibration may indicate a movement from an unsecure mode to a secure policy mode. The reverse sequence of vibrations (long vibration, pause, short vibration) may signal a secure-to-unsecure policy transition. Similarly, in an embodiment, different patterns may indicate different policies or policy security levels. In an embodiment the indicator may be a transmission signal to another device which can provide detailed information about the status of sensors in a user's immediate physical environment. When the platform boots, it may play a pre-provisioned melody over trusted audio output path to indicate filtering integrity and status, in another embodiment. When patches are installed, the system may display a dialogue box to require approval of any policy change through a trusted input channel, in still another embodiment. In an embodiment, the use of trusted input channels to select policy and trusted output channels to display policy integrity and status depends on anticipated threat models and design objectives. In an embodiment, use of untrusted channels may be acceptable for certain uses.

When the user purchases the computer system with a trusted execution environment and a camera, the system may come with privacy filtering capability. In one embodiment, the packaging (e.g. feature list items, special certification or branding stickers) for the system attests that the camera has the ability to prevent unfiltered content from being delivered, other than to user-designated filtering environments. Package-based attestations may represent different levels of trust including, product producer-designations or third party inspections and standards certification (e.g. Underwriter's Laboratory (UL®) listings). If the device supports unfiltered output to untrusted software, a trusted indicator light 18 may be provided to signal or attest to the user which mode the system is in. Like other embodiments discussed above, the user knows when he or she is not protected and the user can believe the results because the policy mode and integrity indicators are trustworthy; that is, they resist spoofing attacks. In an embodiment trusted indicators, also referred to as attestations to the user here, are implemented using secure input/output (I/O) methods. In an embodiment, attestations to the user may be done to assure one of or a plurality of integrity, confidentiality or availability. The choice being apparent to those skilled in the art based on use and anticipated threat models, costs, etc. In an embodiment, attestation methods to the user may change depending on context. For example, spoken attestations might switch to other less conspicuous, less disruptive, more discreet methods when in the presence of others.

Protection of sensor data may vary by the policy. Protection includes the notion that the policy is being applied correctly. The system may refuse to allow mode changes without user consent, in some embodiments. The privacy filtering may be done within a trusted execution environment that is adapted to prevent unauthorized modification. Normal indicator lights on most systems may or may not properly show the mode of the device or its operational integrity because the indicator lights can often be compromised by a variety of attacks, such as unauthorized modification of a software device driver.

Figure 2:
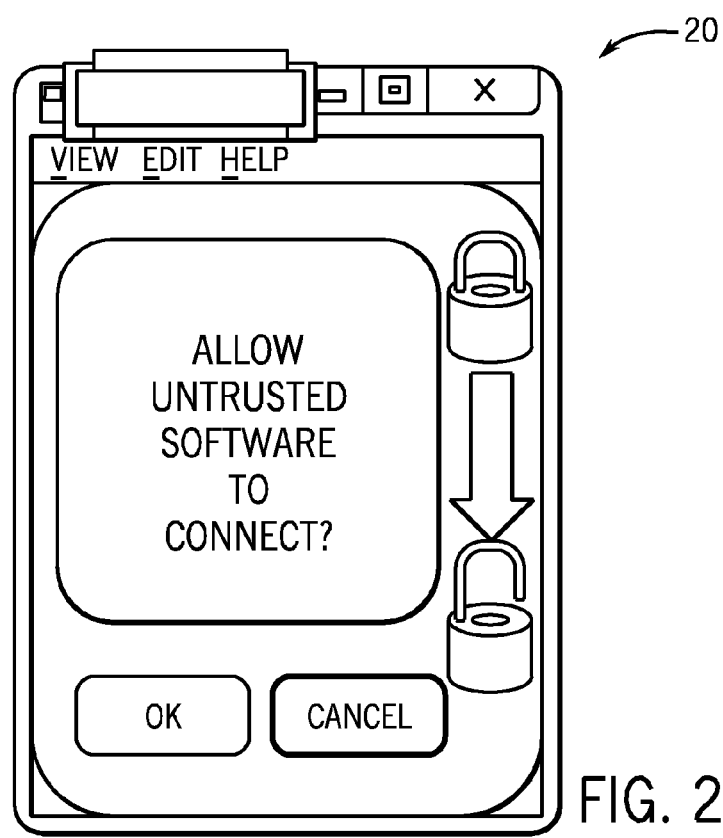
FIG. 2 is a screen display in accordance with one embodiment.

Referring to FIG. 2, a trustworthy graphical user interface screen display 20 may be provided to prevent software which is unverified (untrusted) from connecting to the system and potentially gaining access to sensor data. In the filtering mode, changes to the filter policy settings may require user consent or at least user notification, for example, through the trusted (secure) light indicator 18. In an embodiment, policy mode changes are implemented to resist phishing attacks and other user interface spoofing. The user may allow or disallow untrusted software to connect by clicking one of the buttons labeled "ok" or "cancel." The user can also set the level of security by sliding the lock icon using a mouse cursor, for example. This has utility, for example, when using legacy applications which do not control potential sensor data leakage.

Figure 3:
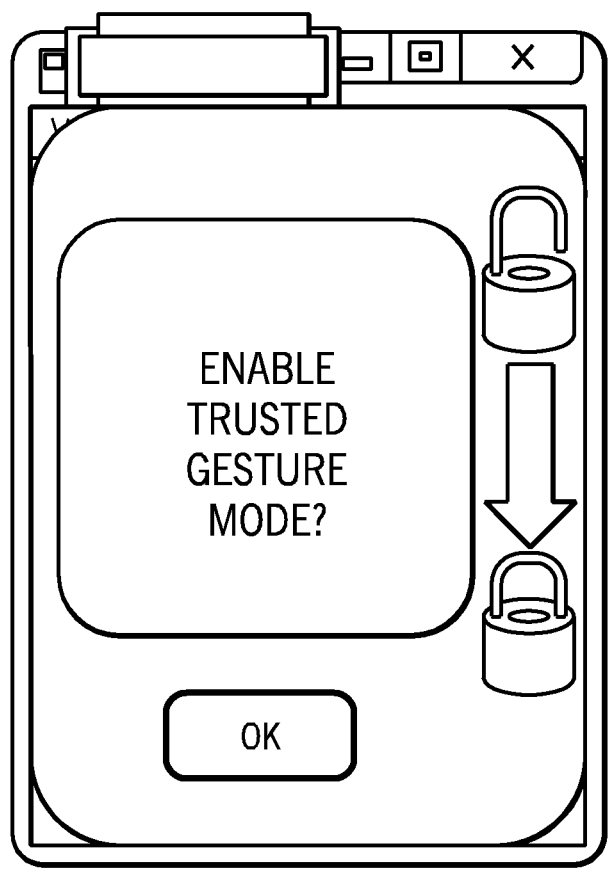
FIG. 3 is a screen display in accordance with another embodiment.

Similarly, referring to FIG. 3, another graphical user interface display may ask the user to enable a camera-based trusted gesture mode. Filter mode changes (i.e. policy changes) for the camera data may require user consent, in some embodiments. Here, the gesture recognition mode agent attests to the camera subsystem, including software stack, that it has the user's blessing to process raw data.

In an embodiment, multiple agents may concurrently request data from a single sensor or multiple sensors. Trusted agents may run in separate trusted execution environments.

Figure 4:
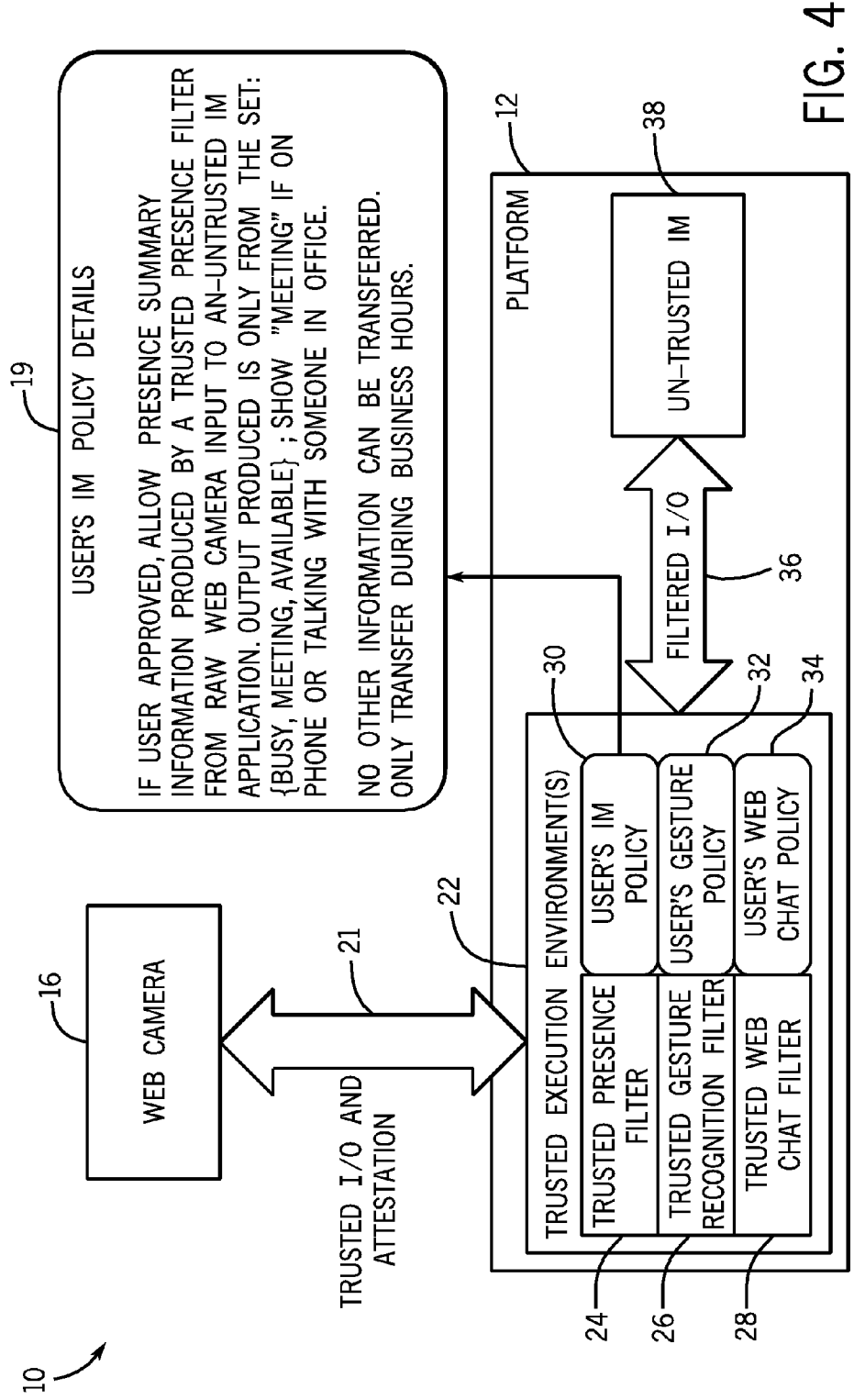
FIG. 4 is a schematic depiction of one embodiment.

Moving next to FIG. 4, the computer system 10 may, in one embodiment, include a web camera 16, coupled by a trusted input/output and attestation channel 21. The platform 12 may include a trusted execution environment 22 that includes a trusted presence filter 24, a trusted gesture recognition filter 26, or a trusted web chat filter 28. A trusted execution environment is described in Patent Cooperation Treaty number WO/2010/057065, published on 20.05.2010. In addition, the environment 22 may include a user's instant messaging (IM) policy 30, a user's gesture policy 32, and a user's web chat policy 34. The filtered input/output data may be provided over the channel 36 to an untrusted IM 38 module, in some embodiments.

The trusted presence filter 24 may filter information about the user's presence status. For example, information from the web camera, from which the user's presence may be determined, may be filtered to obscure the user's appearance or to limit the information that is provided outside the trusted execution environment, for example to prevent identification of depicted persons. Depending on the user's instant messaging policy 30, the trusted presence filter may distribute select or modified information to various applications.

For example, upon user approval, user presence summary information may be produced by a trusted presence filter from raw web camera inputs to an untrusted instant messaging application. Because the receiving application is untrusted, the output produced is limited only to the set of "busy," "meeting," or "available", with "meeting" being indicated if the user is on the phone or talking with someone in the office. No other information may be transferred, in one embodiment, and the information may only be transferred during business hours, as one example.

Similarly, trusted gesture recognition filter 26 may filter out unnecessary information in one embodiment. For example, in one embodiment, when gestural commands are extracted from the raw web camera video, only the information pertinent to the command, such as the gesture and gesture-to-body affinity information (e.g. gestures for person 1, gestures for person 2, etc.) may be conveyed so as to prevent personally identifiable video identification. Trusted gesture recognition filter 26 actions are directed by the user's gesture policy 32, in one embodiment, including output destination. In an embodiment, the raw video traverses a protected input path for gesture extraction in a trusted execution environment. In an embodiment, only gesture and other filter-limited information are provided; the raw video might never be released outside of the trusted execution environment. This is privacy or security preserving while retaining always-on gesture functionality.

Similarly, the trusted web chat filter 28 may filter textual comments made in web chats to prevent identification of sensitive or personal data. For example, key word searching may be used to obscure or remove names, addresses, and other sensitive information, such as bank account information. Trusted web chat filter 28 is directed by the user's web chat policy 34, including output destination.

With the user's approval, presence summary information may be produced by the trusted presence filter 24 from the protected-input-path-derived raw camera video data and given to an untrusted IM application 38 as directed by the user's IM policy 30 shown in block 19. The available outputs may be selected from the set "busy," "meeting," or "available," in one embodiment. "Meeting" may be displayed if the user is on the phone or talking with someone else in the office. In some embodiments, no other information is transferred and transfer may only be allowed during business hours, in one example.

Figure 5:
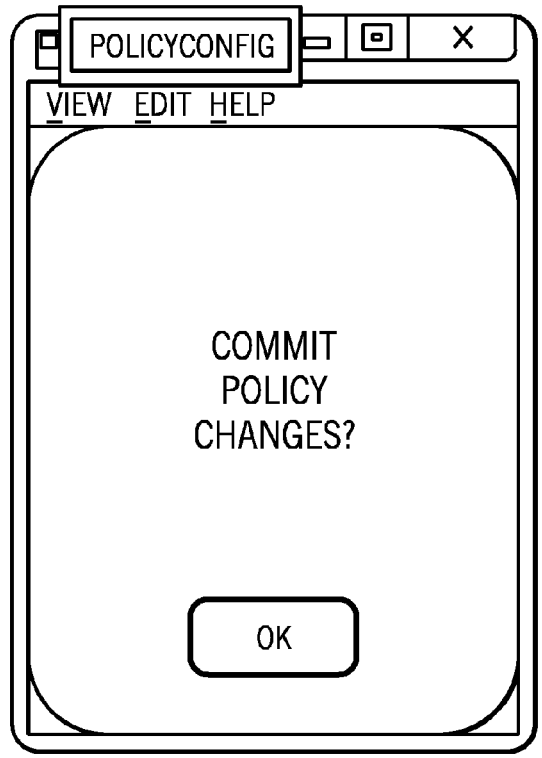
FIG. 5 is a screen display in accordance with one embodiment.

Moving to FIG. 5, in one embodiment, policy changes may require user consent using the graphical user interface shown in FIG. 5. If the user clicks "OK", the policy configuration module attests to policy enforcement filter that the user has authorized the changes and it is trustworthy to make these policy changes. In an embodiment, user consent is made in a manner that uses some form of trusted input. Likewise, in an embodiment, the graphical user interface is conducted over a trusted output channel such as PAVP (Protected Audio Video Path).

Figure 6:
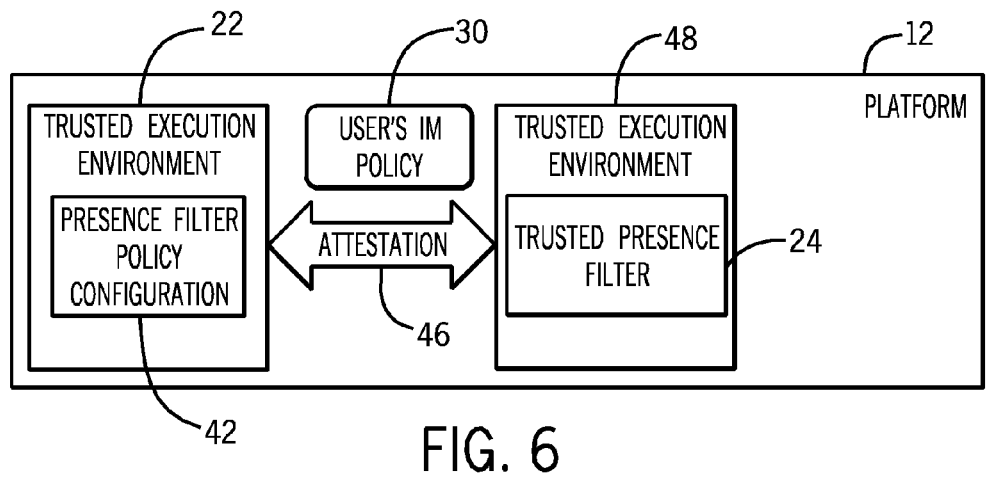
FIG. 6 is a schematic depiction of another embodiment.

Turning to FIG. 6, the platform 12 may include the trusted execution environment 22 and the presence filter policy configuration 42. The trusted presence filter 24 resides in a separate trusted execution environment 48. The trusted execution environments 22 and 48 may attest to one another as well as exchange information in a secure manner. For instance, attestation 46 may be provided to the trusted execution environment 48 that includes the trusted presence filter 24. The user's IM policy 30 may also be provided by the trusted presence filter 24 to the trusted presence filter 24 after attestation. In an embodiment, trust elements may be partitioned in a manner deemed necessary as long as chains of trust (via attestation) are maintained.

The system may attest to the user in a number of ways, including combinations of interfacing methods. Attestation 46 may be queried, needed during points of policy or system modification, given at specific times or intervals, or used constantly. Attestation examples may include changes to the structure and/or functional behavior of the system. Threshold functions or other policies can be used to allow minor or innocuous changes without requiring user intervention. For example, in one embodiment, a dialog box or dedicated display may be operated whenever the policy or system is modified, requiring approval with a pre-provisioned, recognizable image on the screen.

For systems employing depth-sensing cameras and projection systems, such attestation interfaces may be displayed, for example, on a variety of surfaces, such as a wall, tabletops, or a management screen.

In an embodiment, attestation may be via a companion or paired device. For example, a message may be sent to another system owned by the user and displayed when the policy or system is modified and requires approval. Packages for devices may include notices that attest to the compliance of the device and its operation. The system can refuse to operate unless compliant and attestable subsystems are connected and compliant subsystems can refuse to deliver raw data without attestation of the filtering system.

In an embodiment the device user is in control of the policies on the device and can receive attestation that the system is implementing the policy selected. In an embodiment the device owner or entity, not necessarily the device user, is in control of the policies on the device and can receive attestation that the system is implementing the policy selected. In an embodiment the environment owner is in control of the policies on the device and can receive attestation that the system is implementing the policy selected. For example, before a device user walks into a sensitive facility, the device user selects a policy that turns the camera and microphone (and possibly other) sensors off. The facility's infrastructure or guards then seek attestation from the device that a prescribed list of sensors (e.g. camera and microphone) are, indeed, off. In another scenario, the facility environment both asserts the sensors-off policy and seeks attestation from the device without control given to the device user. These kinds of examples may apply, for instance, in corporate environments. In an embodiment the device cooperates with other devices in immediate vicinity to determine a shared policy that is appropriate to the immediate situation. For example, in an emergency situation, device sensors may be automatically activated to capture critical information that can assist emergency responders. Device owners may have a pre-established policy that allows their device to enter such a mode as long as the captured information is only shared with a trusted entity such as a local police or fire department.

In an embodiment, indicator lights, such as the indicator light 18 (FIG. 1), of different colors or blinking or sequencing patterns or numbers may be provided, with one color or pattern indicating tampered or modified. Another color may indicate approval of modifications or policy as needed, and another color may indicate approval. Other pre-provisioned sensory outputs may be controlled as well.

Different sensor outputs or recordings may be played at boot, system acceptance of policy, system modification, at boot strap power on, at receipt of mode change requests, or approval of mode changes of operation. System functionalities may be enabled or disabled when system integrity issues are detected. System integrity issues may be due to attacks or internal failures. Outputs untrusted to the receiving system or agents may be handled by cutting off or modifying output. For example, the device may power off, sensitive functionality may be disabled, screen display may be blurred, or an output may be provided to notify the user. The physical shape of the system may be changed in response to detection of system integrity failures to indicate integrity status and reduce additional security or privacy exposure. For example, a robotic system may curl up or point sensors to the floor when attestation fails. The camera may be operated to point down or close a physical shutter.

Figure 7:
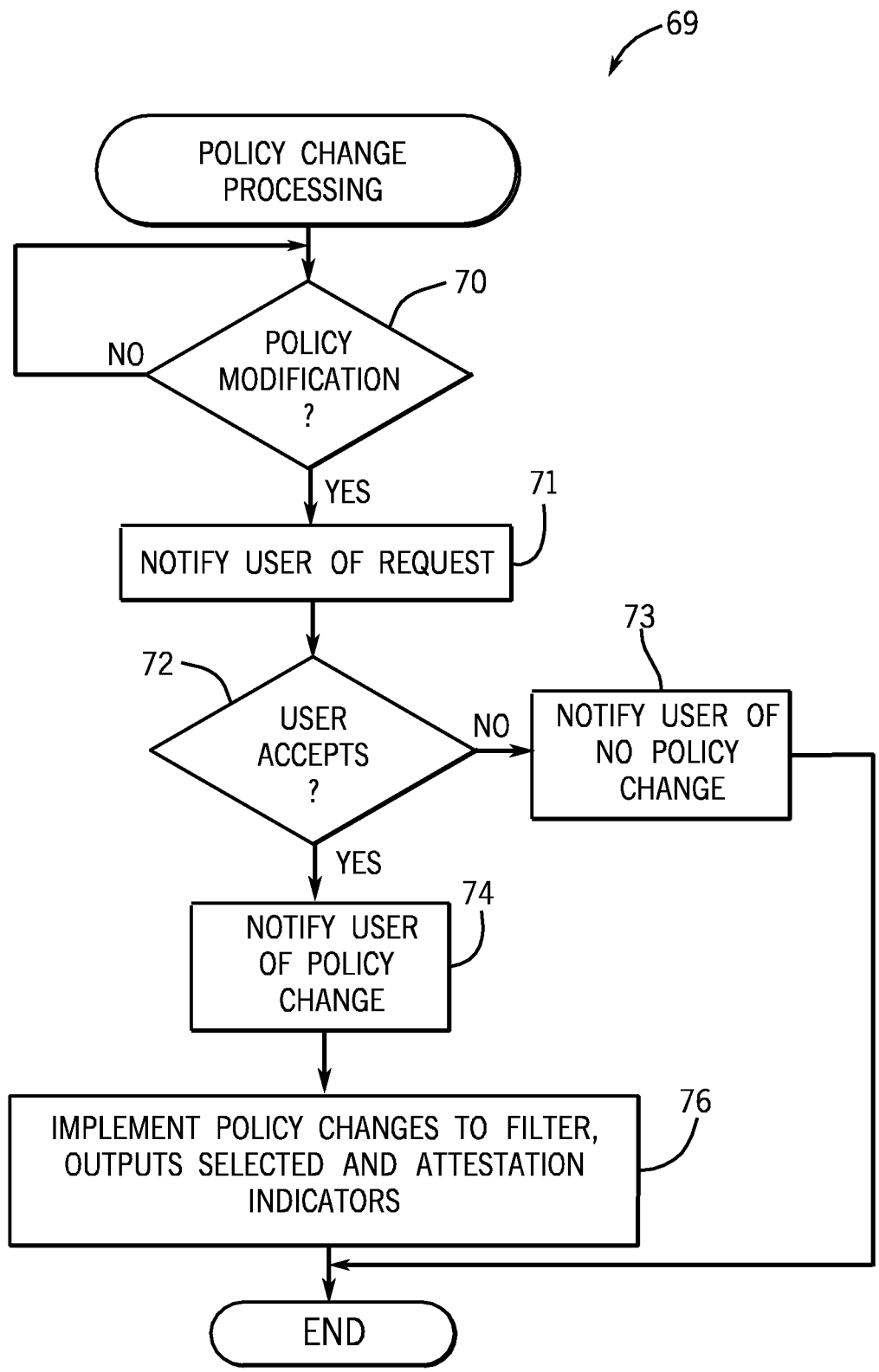
FIG. 7 is a flow chart for one embodiment of policy selection control flow.
Figure 8:
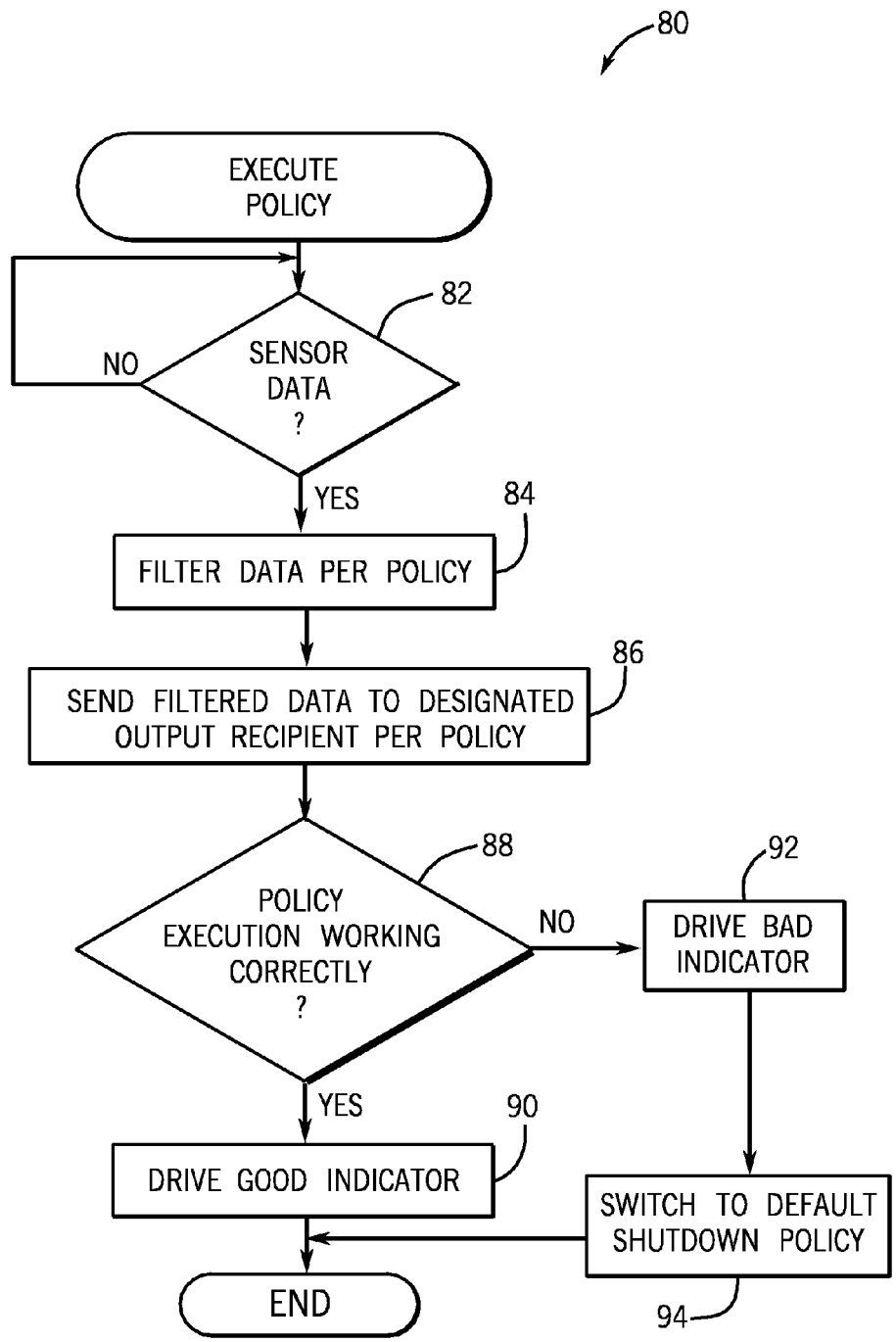
FIG. 8 is a flow chart for one embodiment of sensor data filtering.

In accordance with some embodiments, sequences 69 (FIG. 7) and 80 (FIG. 8) may be implemented in software, firmware, and/or hardware. In software and firmware embodiments, each sequence may be implemented by computer executable instructions stored on one or more non-transitory non-volatile computer readable media, such as an optical, magnetic, or semiconductor memory. In one embodiment, computer readable instructions may be stored within the trusted execution environment 22, shown in FIG. 4.

Sequence 69 (FIG. 7) logically represents the policy selection control flow. Sequence 69 may, for example, be event driven or operated in a polled manner (e.g. in a loop), starting at decision diamond 70.

At decision diamond 70 a check is made to see if a policy modification has been requested. Policy modification requests may be triggered from several possible sources such as the starting of an application, changing user or system or environment context, device user requests, device owner requests, environment requests, and so on. If a policy modification is not requested, the system continues to check or wait for notification. If a policy notification is requested, then the user is notified of the policy modification request at block 71. In an embodiment, notification may include indication of the current policy in place and its status. In an embodiment, notification may include a query requesting user acceptance of the policy change.

Decision diamond 72 determines the user's response to the policy change request. If the user does not accept the policy change, the user is notified that there are no policy changes in block 73 and this policy modification request instance terminates. In an embodiment, user notification for non-acceptance of policy changes is optional.

If the user does accept the policy change at 72, then the user is notified of the policy changes in block 74. At block 76 the policy changes are implemented: sensor output stream filters are selected; output destinations are selected; and attestation indicators are updated. At this point, the system watches for the next policy modification request either by polling or event.

In an embodiment, policy change modifications may only name the new policy. In an embodiment, policy change modifications only announce salient differences between the previous and new policies. In an embodiment, policy changes may be implicitly inferred from the new operational context. For instance, if the application precipitating a policy change launches, it may be sufficient to let the successful launch of that application indicate that the policy change was successful. Likewise, an unsuccessful application launch might indicate the policy change was unsuccessful (i.e. denied by the user).

In an embodiment, output destinations of the (policy enforced) filtered sensor data may be drivers or applications on the local platform or remote platforms. In an embodiment, policy queries or challenges (e.g. attestation requests) from a user may be handled like policy change modifications. In an embodiment, elements of the policy change modification may be used to handle policy queries or challenges.

For example, if a device user walks into an area restricting photography, in an embodiment, the environment may (optionally) request the device for its current camera policy status. If the device responds that the camera is on, the environment may then request the device to turn off its camera for a geography-defined space (i.e. geofencing). In an embodiment, the device user can accept the policy modification. The system then attests to both the device user and the environment that the camera is off. In an embodiment, the device user is not notified of the policy change, but the environment is notified. The user discovers the policy by posted signage or by previous agreement or by the inability of the camera application to either start or take a picture.

For example, a user has always-on gesture recognition through on-platform cameras. The policy may be to keep all raw video protected and sequestered, but gesture information may be released to other applications. When a video chat application (e.g. Skype) is started, in an embodiment, the system may ask the user to confirm that the video stream will be released to the legacy software stack for the duration of the video chat.

Sequence 80 (FIG. 8) represents the sensor data filtering control flow. Sequence 80 may be either event driven or operated in a polled manner (e.g. in a loop), starting at decision diamond 82.

If sensor data is not available at decision diamond 82, the system waits for data either through event notification or polling. If sensor data is available at decision diamond 82, then for each output recipient, the sensor data is filtered as per the policy for that output recipient by block 84. Then in block 86, the filtered sensor data produced by block 84 is sent to the designated output recipient. The sensor data may be filtered, as indicated in block 84, in accordance with a policy enforced by the trusted execution environment 22 (FIG. 4). Filtering 84 takes place within the trusted execution environment 22. Then the filtered data may be output, as indicated in block 86, according to the selected policy. The output can be sent to an agent hosted in a trusted execution environment or released to an untrusted agent on the platform.

Then, at decision diamond 88 an integrity check is performed on the policy enforcement mechanism which includes the sensor data filter. For example, when code is initially loaded into the trusted execution environment 48, it may be cryptographically measured and verified in a manner known to those skilled in the art. Code measurement allows the trusted execution environment to make attestations about the code integrity and that the code is from a known and approved source. In an embodiment, during operation, run-time verification may also be used to check data, code, data-flow and control-flow integrity. In an embodiment, checks are run over a portion or abstraction of the code or data implementing the data filtering and output policy. In an embodiment, checks are run over all of the code or data implementing the data filtering and output policy. In an embodiment, only load-time integrity checks (e.g. measurements) of the policy code and data may be performed.

If policy execution (e.g. sensor data filtering) is determined to not be working correctly in decision diamond 88, the policy is recognized not to be properly enforcing the selected level of privacy or security. At block 92, the system drives a policy failure or "bad" indicator and switches at block 94 to a default safety or shutdown policy. In an embodiment, block 94 may halt the entire system or subsystem. In an embodiment block 94 may stop sensor data production by turning off the sensors or inserting a no-pass nullifying filter which essentially tosses away all sensor data. Nullifying filters may substitute a pre-provisioned data value or random noise in lieu of live, filtered sensor data. In an embodiment, block 94 may switch to a default policy that is more restrictive than the current policy. In some embodiments, all policies may switch to a single policy, or a plurality of default policies may exist. In one embodiment, block 94 may attempt to reload and restart the current policy.

At 88, if the policy execution is determined to be working correctly, the system drives a "good" indicator at block 90 to show the user that policy systems are working correctly.

The following clauses and/or examples pertain to further embodiments:

One example embodiment may be an apparatus comprising a platform to provide a trusted execution environment, a policy to control distribution of sensor data, and attestation of policy compliance, and an indicator coupled to said platform to indicate policy compliance. The apparatus may include said platform to pass through unmodified sensor data without distribution restriction.

Another example embodiment may be one or more non-volatile computer readable media storing instructions to enable a processor to perform a sequence comprising receiving sensor data, acquiring a policy to control the distribution of sensor data, applying the policy in a trusted execution environment, and providing attestation of policy compliance. The media may include passing through unmodified sensor data without distribution restriction. The media may include acquiring and configuring the policy to control the distribution of sensor data using external context data. The media may include providing external access control policies. The media may include using data about platform or network system topology. The media may include using data about the identity of target entities. The media may include applying the policy to restrict distribution of sensor data via secured communication links. The media may include applying the policy to control the distribution of sensor data using external context data. The media may include applying the policy to control the distribution of sensor data using external access control policies. The media may include applying the policy to control the distribution of sensor data using data about platform or network system topology. The media may include applying the policy to control the distribution of sensor data using data about the identity of target entities. The media may include applying the policy to restrict distribution of sensor data. The media may include applying the policy to remove or obscure all or part of the sensor data. The media may include applying the policy to control where the sensor data may be distributed. The media may include providing attestation of policy changes.

In another example embodiment a method comprising receiving sensor data in a processor-based system, acquiring a policy to control the distribution of sensor data, applying the policy in a trusted execution environment, and providing attestation of policy compliance. The method may also include passing through unmodified sensor data without distribution restriction. The method may also include acquiring and configuring the policy to control the distribution of sensor data using external context data.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
 a hardware platform to provide a trusted execution environment, a policy to control distribution of sensor data, and attestation of policy compliance, said platform to modify only a portion of the sensor data to limit dissemination of personal identity or location information, said platform to filter video data by blackening depth-labeled image pixels greater than a prior depth from an imaging device; and
 a hardware indicator coupled to said platform to indicate policy compliance.

2. The apparatus of claim 1, said platform to pass through unmodified sensor data without distribution restriction.

3. The apparatus of claim 1 said platform to acquire and configure the policy to control the distribution of sensor data using external context data.

4. The apparatus of claim 3 said platform to provide external access control policies.

5. The apparatus of claim 4 said platform to use data about the platform or network system topology.

6. The apparatus of claim 1, said platform to identify a human face in said sensor data and to obscure said face.

7. The apparatus of claim 1, said platform to identify location information in said sensor data and to obscure said location information.

8. One or more non-volatile non-transitory computer readable media storing instructions to enable a hardware processor to perform a sequence comprising:
  receiving sensor data;
  acquiring a policy to control the distribution of sensor data;
  applying the policy in a trusted execution environment provisioned by said hardware processor;
  providing attestation of policy compliance;
  modifying, using said hardware processor, only a portion of the sensor data to limit dissemination of personal identity or location information; and
  filtering video data by blackening depth-labeled image pixels greater than a prior depth from an imaging device.

9. The media of claim 8 including acquiring and configuring the policy to control the distribution of sensor data using external context data.

10. The media of claim 9 including providing external access control policies.

11. The media of claim 9 including using data about platform or network system topology.

12. The media of claim 11 including applying the policy to restrict distribution of sensor data via secured communication links.

13. The media of claim 9 including using data about the identity of target entities.

14. The media of claim 9 including applying the policy to control where the sensor data may be distributed.

15. The media of claim 8 including applying the policy to control the distribution of sensor data using external context data.

16. The media of claim 8 including applying the policy to restrict distribution of sensor data.

17. The media of claim 8 including applying the policy to remove or obscure all or part of the sensor data.

18. The media of claim 8 including providing attestation of policy changes.

19. The media of claim 8 including storing the policy in a secure execution environment.

20. The media of claim 19 including switching to a new sensor data distribution policy to shut off distribution.

21. The media of claim 8 including providing an indication that said policy is being applied.

22. The media of claim 8 including trusted execution environment being provided by the Secure Enclaves processor feature.

23. The media of claim 8 including filtering user presence data to only indicate whether the user is available, in a meeting, or busy.

24. The media of claim 8, said sequence including identifying a human face in said sensor data and to obscure said face.

25. The media of claim 8, said sequence including identifying location information in said sensor data and to obscure said location information.

26. A processor based system comprising:
  a sensor;
  a trusted execution environment;
  a hardware processor to acquire a policy to control the distribution of sensor data and apply the policy in a trusted execution environment and modify only a portion of the sensor data to limit dissemination of personal identity or location information, said processor to filter video data by blackening depth-labeled image pixels greater than a prior depth from an imaging device; and
  an indicator to provide attestation of policy compliance.

27. The system of claim 26, said processor to pass through unmodified sensor data without distribution restriction.

28. The system of claim 26, said processor to acquire and configure the policy to control the distribution of sensor data using external context data.

29. The system of claim 26, said processor to provide external access control policies.

* * * * *